United States Patent
Blanco

(10) Patent No.: US 8,055,083 B2
(45) Date of Patent: Nov. 8, 2011

(54) PORTABLE BITMAP RENDERING SYSTEMS AND METHODS

(75) Inventor: Alvaro J. Blanco, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1336 days.

(21) Appl. No.: 11/334,202

(22) Filed: Jan. 18, 2006

(65) Prior Publication Data

US 2007/0165250 A1 Jul. 19, 2007

(51) Int. Cl.
*G06K 9/36* (2006.01)
(52) U.S. Cl. ............. 382/232; 358/1.16; 345/520
(58) Field of Classification Search ............. 382/232; 358/1.16; 345/520
See application file for complete search history.

(56) References Cited

U.S. PATENT DOCUMENTS

2002/0083121 A1 * 6/2002 Chang et al. ............. 709/201
2003/0208638 A1 11/2003 Abrams, Jr. et al.
2006/0005205 A1 * 1/2006 Illowsky et al. ............. 719/315
* cited by examiner

*Primary Examiner* — David Nelms
*Assistant Examiner* — Nathanael R Briggs
(74) *Attorney, Agent, or Firm* — Gibb I.P. Law Firm, LLC

(57) ABSTRACT

One method embodiment executes a director. The director invokes at least one "active stamp" when processing data, where each of the active stamps relates to a different data manipulation method. The active stamps comprise specialized, portable and dynamic logic processes generically applicable to a plurality of different directors such that each of the active stamps can be individually invoked by each of the different directors to perform the same operation for each of the different directors. The invoking of the active stamps by the director calls the active stamps from a resource in a structure that allows each of the different directors to individually access each of the active stamps that correspond to a current data manipulation process being invoked by each of the different directors. Because the director calls the active stamps at run time of the processing of the data, the active stamps avoid having to be compiled with the director. The active stamps can also subscribe and listen to events as they occur during the processing of the data.

18 Claims, 7 Drawing Sheets

PORTABLE BITMAP RENDERING SYSTEMS AND METHODS

BACKGROUND

Embodiments herein generally relate to systems and methods for rendering bit map data. This includes previously received images encoded in any format convertible into bitmap data and text data to be converted into bitmap data.

There are several approaches available to produce printed material from digital sources (i.e., LCDS, PostScript, IPDS, PCLx, etc.). All those methods have a common goal to generate a bitmap that represents the printable image. In general, all these methods are incompatible with each other. Furthermore, most of the methods impose rules/restrictions on the way they achieve their results. For instance, a method might recognize only certain image encoding subset. Or the method can perform line spacing in a particular manner. The user cannot change, or will have little influence on, those behaviors.

SUMMARY

One exemplary method embodiment herein executes a director. The director invokes at least one "active stamp" when processing data, where each of the active stamps relates to a different data manipulation method. The active stamps comprise specialized, portable and dynamic logic processes generically applicable to a plurality of different directors such that each of the active stamps can be individually invoked by each of the different directors to perform the same operation for each of the different directors. The invoking of the active stamps by the director calls the active stamps from an active stamp repository (resource) in a structure that allows each of the different directors to individually access each of the active stamps that correspond to a current data manipulation process being invoked by each of the different directors. Because the director calls the active stamps at run time of the processing of the data, the active stamps avoid having to be compiled with the director. The active stamps can also subscribe and listen to events as they occur during the processing of the data.

One exemplary system embodiment herein comprises the director operatively connected to the plurality of active stamps, and a processor on which the director executes. The director is adapted to invoke at least one of the active stamps when processing data, and again, each of the active stamps relates to a different data manipulation method. The active stamp repository (resource) is operatively connected to the different directors in a structure that allows each of the different directors to individually access each of the active stamps that correspond to a current data manipulation process being invoked by each of the different directors. Again, the active stamps are adapted to subscribe and listen to events as they occur during the processing of the data.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
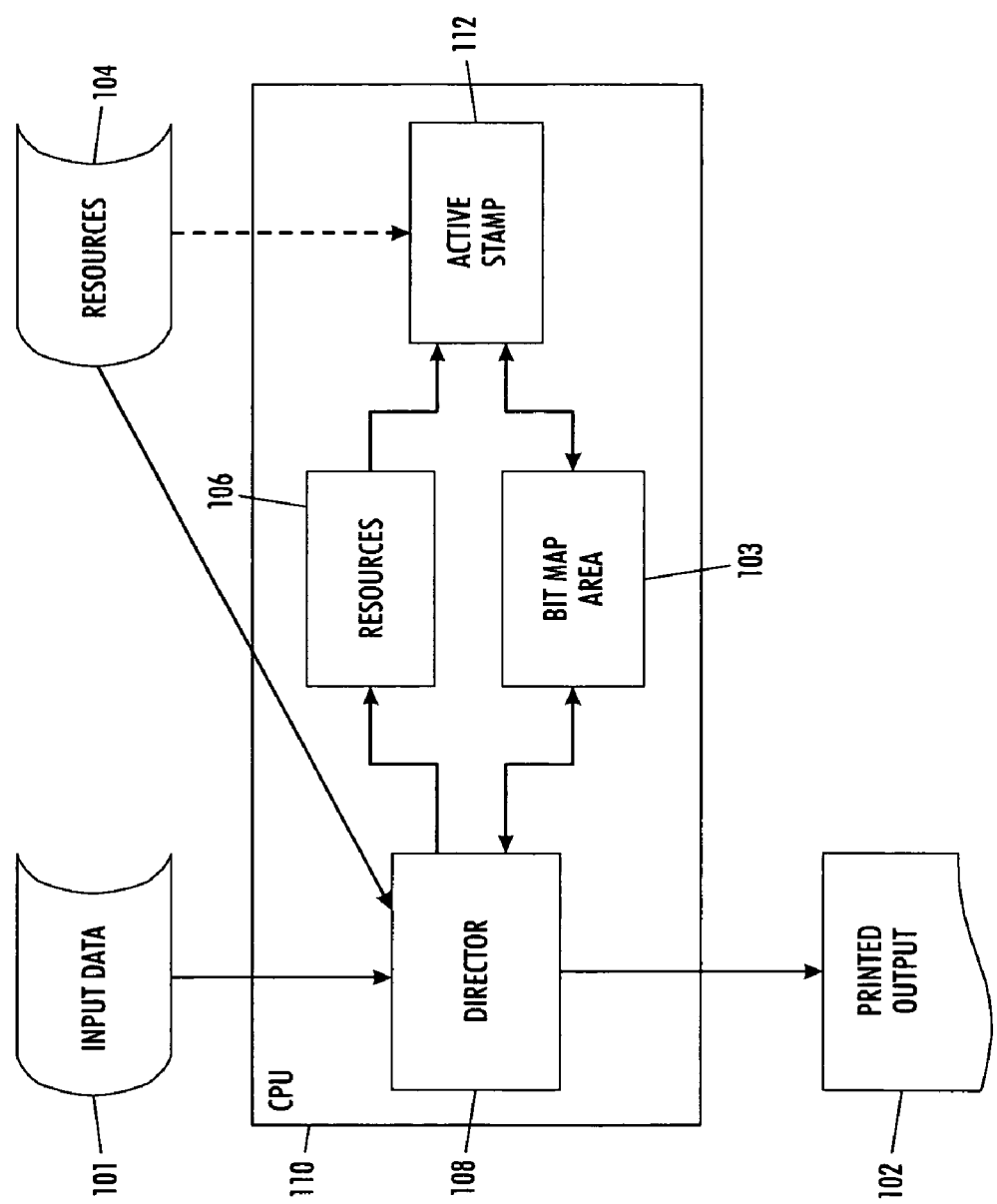
FIG. 1 is a schematic representation of an exemplary system embodiment.

The term director is used to refer to any device or element that processes data. For example, one type of director discussed in many examples used herein could have the objective of production of a bit map in memory. Although one intent is to address directors oriented to perform electronic printing, the concepts described herein are applicable to other directors as well (i.e.; display directors). Directors are processes that receive (read) data and commands from any source and use those data/commands to set up the proper environment so that pages can be printed by a printer (or displayed by a display device). In the case of intelligent printers, directors can be, and will frequently be, part of the internal processor of such printers. Alternatively, directors can run in a host system that transmits a bit map together with print commands to a printer. Conversely, a graphic user interface can use a director as a sub-process, but the GUI performs many activities that are out of the scope of the directors (i.e., reading and interpreting user commands, exchanging messages with the user, start and/or stop processes, etc.).

The "active stamps" (or ActiveStamps) according to embodiments herein comprise specialized, portable and dynamic logic processes that have the common objective of filling a memory bit map (raw bit map) and that communicate through a standard interface. Active stamps according to embodiments herein are specialized because each one is designed to fill the bit map area in a different way than others. The way in which each active stamp fills the bit map area is based on the particular input each active stamp is capable of manipulating. Active stamps according to embodiments herein are portable because they can be called by different directors, provided all active stamps are designed to run under the same operational system. The active stamps according to embodiments herein are dynamic because they are called by the director at run time without having to be compiled/built together with the director.

In the case of graphic files (image files) the embodiments herein deal with logic associated with decompression by moving the compression/decompression outside the printing program and into the active stamps. As one example, different active stamps in embodiments herein can perform different compression/decompression algorithms. For example, one active stamp can be developed to decompress one particular type of compressed image, while another active stamp can decompress a different type of compressed image. Thus, one active stamp can produce the raw bit map representation of any image compressed following a particular compression algorithm. Thus, there could be at least one active stamp for each image compression algorithm (there can be more than one active stamp for the same compression algorithm). One simple reason for this duality is that, for example, one active stamp could be developed to be optimized for speed while another active stamp could be optimized for memory utilization. As explained in greater detail below, the active stamps of embodiments herein are not limited to decompression, but instead are widely applicable to all forms of data manipulation including but not limited to font manipulation, typesetting manipulation, logo type manipulation, image manipulation, drawer manipulation, form manipulation, section manipulation, page manipulation, plate manipulation, etc.

One feature of embodiments herein is that the director can use any active stamp depending on some specific need. Also, once new active stamps are developed, new directors can be developed to take advantage of the new and existing active stamps. Thus, the results produced by all directors that use the same active stamp(s) will be consistent because each director will use the exact same active stamp to perform the specific data manipulation.

Directors can call different types of active stamps precisely when they are needed for data manipulation. Conventionally, when a user needed to print a page that contained an image, the user had to inform the director of the type of image, the compression type, etc. for the image. This was conventionally done through some command embedded in the input data stream submitted to the director. Therefore, conventionally, the director did not know in advance what types of image(s) or compression a particular report would require, instead, the director was informed at run time through the data stream. A similar operation can be used with active stamps in embodiments herein. More specifically, in such embodiments, the input data stream embedded command that informs the director which image to print, also informs the director as to which active stamp should be used to decompress the image. Thus, with embodiments herein, the director will be informed which active stamp(s) should be used, will be able to locate the corresponding active stamp in the environment (e.g., at an active stamp repository), load the active stamp into memory, and dynamically execute the active stamp, all at the time when such data manipulation processing is needed.

There are an unlimited number of types of ActiveStamps, depending on particular goals. The ActiveStamps can be derived from a generic ActiveStamp. Some exemplary ActiveStamps that are discussed below include ActiveFont, ActiveTypeSetter, ActiveLogotype, ActiveImage, ActiveDrawer, ActiveForm, ActiveSection, ActivePage, ActivePlate, etc. One ordinarily skilled in the art would understand that there could be many additional types of ActiveStamps and that the following are merely examples. Thus, there can be other AciveStamps developed as the needs arise but, any ActiveStamp developed will naturally integrate into any existing system (director) capable of handling ActiveStamps, without needing to rebuild the director. Thus, the active stamps of embodiments herein produce substantial savings in processing resources because the active stamps avoid the conventional need of a director to build a unique algorithm to perform some specific data manipulation. Such conventional unique algorithms generally could not be shared between directors because of non-compatibility issues between the directors. To the contrary, With embodiments herein, the active stamps are generically applicable to many different directors such that each of the active stamps can be invoked by the different directors to perform the same operation for each of the different directors. To facilitate such use, embodiments herein provide an active stamp repository (resource) that is operatively connected to the different directors in a structure that allows each of the different directors to individually access each of the active stamps that correspond to a current data manipulation process being invoked by each of the different directors.

The active font stamp (sometimes referred to herein as "ActiveFont") is a generalization for any object that can be used to produce the bitmap of a string of digital characters based on a font representation. Given that fonts can be represented in different ways, it is more likely that different ActiveFonts will be developed for each representation. Hence there can be ActiveFixedFont, ActiveProportionalFont, ActiveContourFont, etc., all of them deriving from ActiveFont. For example, the ActiveFixedFont can be used to produce a bit map of a string of characters whose width is always the same (i.e.; most typewriters produce a fixed width spaced string of text). ActiveProportionalFont can be used to produce a bit map of a string of characters whose width is proportional to the character (i.e.; the character 'i' is much narrower than the character 'm'). ActiveContourFont is an active stamp capable of processing fonts whose characters are represented through mathematical formulas rather than bit maps. Embodiments herein can have an ActiveFont capable of handling more than one, or even all the different font representations existent at a particular time.

The active typesetting stamp (sometimes referred to herein as "ActiveTypeSetter") is responsible for rendering related collections of digital strings. To do so the ActiveTypeSetter uses the services of one or more ActiveFont. The ActiveTypeSetter can be populated with strings by the director or other ActiveStamps. The ActiveTypeSetter can also contain one or multiple fixed strings to be rendered when needed. The common function of the ActiveTypeSetter is to render successive print lines into the bitmap. The ActiveTypeSetter can subscribe and listen to the newLine event (as discussed in greater detail below). The active logo stamp (sometimes referred to herein as "ActiveLogotype") is essentially an ActiveTypeSetter that utilizes one or more ActiveFonts and carries constant text strings that produce the desired logotype effect.

The active image stamp (sometimes referred to herein as "ActiveImage") is responsible for rendering 'images' represented by bitmaps, which may or may not be encoded/compressed. As there are several different encoding/compressing algorithms, there can be specialized ActiveImage objects. Thus, possible ActiveImage objects are: ActiveInterpressImage, ActiveJPEGImage, etc, all deriving from ActiveImage. The ActiveInterpressImage is an active stamp capable of producing a bit map by decoding an image encoded using the Interpress standard. The ActiveJPEGImage is an active stamp capable of producing a bit map by decoding an image encoded using the JPEG standard. The active draw stamp (sometimes referred to herein as "ActiveDrawer") is responsible for producing a bitmap based on drawing commands submitted by the director. The ActiveDrawer is capable of generate lines, curves, circles, ellipses, etc.

The active form stamp (sometimes referred to herein as "ActiveForm") is used to mimic the effect of a preprinted form. The ActiveForm is actually a collection of other ActiveStamps that together produce the expected result.

The active section stamp (sometimes referred to herein as "ActiveSection") is just the representation of part of a bitmap. The ActiveSection can be a collection of other ActiveStamps that together produce the expected result. The ActiveSection is different from the ActiveForm in that the ActiveSection can be populated/altered by variable data, whilst the ActiveForm uses non-variable data.

The active page stamp (sometimes referred to herein as "ActivePage") is the representation of a logical page. Examples of ActivePages include: bank statements, the pages of an inventory control report, pages of a catalog or list, etc. The ActivePage can subscribe and listen to the newPage event (see the discussion of events below). The ActivePage can be a collection of other ActiveStamps that together produce the expected results.

The active plate stamp (sometimes referred to herein as "ActivePlate") is a bitmap that represents the whole image put on one side of a sheet of paper. In general the ActivePlate contains one or more ActivePages but it could optionally incorporate also an ActiveForm and/or ActiveTypeSetters to print sheet numbers or other information necessary at physical sheet side level. There can be two ActivePlates: ActiveFrontSide and ActiveBackSide. ActivePlates find their application specifically in printing. This data is generally only displayed when it is needed to show (display) exactly what a plate would look like when printed. A plate is a graphic industry term used to identify a printed page. In the graphic industry there are separate plates for different colors and multiple plates are overprinted to obtain a single color page. In the active stamp case it is useful to differentiate front and back plates. This is the case when the front image (front plate) and the back image (back plate) must be coincident with each other but they are not centered in the paper. Hence, if the front plate is 'shifted' to the right for example, the back plate must be 'shifted' to left accordingly (assuming that the paper is turned using its vertical axis). The ActivePlate can subscribe and listen to the newPlate, newFrontPlate and newBackPlate events.

Active stamps are different than conventional drivers, which are specialized programs whose function is to enable a host computer to command (drive) input/output devices (keyboard, mouse, display, disk, CD/DVD, printer, etc.). Drivers are dependent on the operating systems for which they are designed to operate on and are not generically useful by a wide variety of directors, as active stamps are. Hence, a disk drive will require a driver to work under one operating system (e.g., Windows operating system available from Microsoft Corporation, Redmond, Wash., USA) and another one to run under a different operating system (e.g., MacIntosh operating system, available from Apple Corporation, Cupertino, Calif., USA). Drivers are based on the communication protocol used by the hardware they are designed to 'drive' and also the communication protocol used by the operational system. Hence a driver is actually a translator between the operational system and the input/output device. Active stamps are different than drivers because they are not based on any particular input/output device and do not communicate directly or indirectly to any such device. It is the director that may require communicating to some input/output device and, when doing so, it will need to use, directly or indirectly, the proper driver.

As alluded to above, the ActiveStamps can subscribe and listen to events as they occur during the process of any input data stream, for example a data stream that forms a bitmap. The purpose of this subscription/listening is to react and perform certain tasks when those events are declared or occur. The ActiveStamps can declare the occurrence of events that other ActiveStamps (or itself) could subscribe/listen to. Many of the events are declared by the director (system) as a result of the occurrence of certain conditions in the input stream. For instance, some of the events that the director can declare are: newLine, newLineNumber, newPage, newPlate, newReport, endOfReport, etc. The newLine event is declared by the director when the director identifies the existence of a new line of data in the input stream. The newLineNumber event is a variation of the newLine where the director communicates the line number of the newly identified line (Some active stamps may subscribe to certain line numbers only, for instance, a range between lines 10 and 20). The newPage event is declared by the director when the director identifies the existent of a new page condition in the input data stream. The newPlate event is declared by the director when the director identifies the presence of the condition(s) that require a new plate to be started (and the current one is then completed). The newReport event is declared by the director when the director identifies the presence of the condition(s) that requires the starting of a new report. The endOfReport event is declared by the director when the director identifies the condition(s) in the input stream that signals the end of the current report. When an event is declared, the director will call all the subscribers of that event in a predefined sequence.

As mentioned above, the director can be any software capable of using the services of any ActiveStamp and that follows the predefines rules to make use of those services. All current printing systems can be upgraded to become ActiveStamp directors. Active stamps are invoked by the director as to fill a memory resident bit map area allocated by the director. It is conceivable to have active stamps that can be used to produce a file containing a bip map representation in whatever encoding desired. Embodiments herein fill the bit map area based on information received from the director and, depending on its specialization, electronic files or other active stamps.

FIG. 1 is a simplified/generalized diagram that exhibits the basic relationship between an active stamp 112 and a director 108 executing on a processor 110, such as a CPU (central processing unit). The director 108 obtains data from an input media 101 and uses it to produce a printed or display output 102. To accomplish its objective the director 108 converts the input data into a bit map 103 that represents the information printed on a page. The conversion process uses certain resources (external to the CPU 110) 104 and (internal to the CPU) 106 that are accessed by the director 108 (or optionally accessed directly by the active stamp 112). The director 108 does not have the conversion information to convert the data from the resources 104, 106 into a bit map. Therefore, the director 108 requests the service of the active stamp 112 that holds the information necessary for the conversion. Item 104 is the archived version of the resource. Item 106 is a copy in memory of 104. The director uses item 104 to instantiate the active stamp in memory only once when so referred by the input data stream. From that moment on only 106 is used. The director 108 makes available (passes) the resource(s) and the bit map to the active stamp 112. The active stamp 112 executes the conversion, fills the bit map accordingly and returns the control to the director 108.

Figure 2:
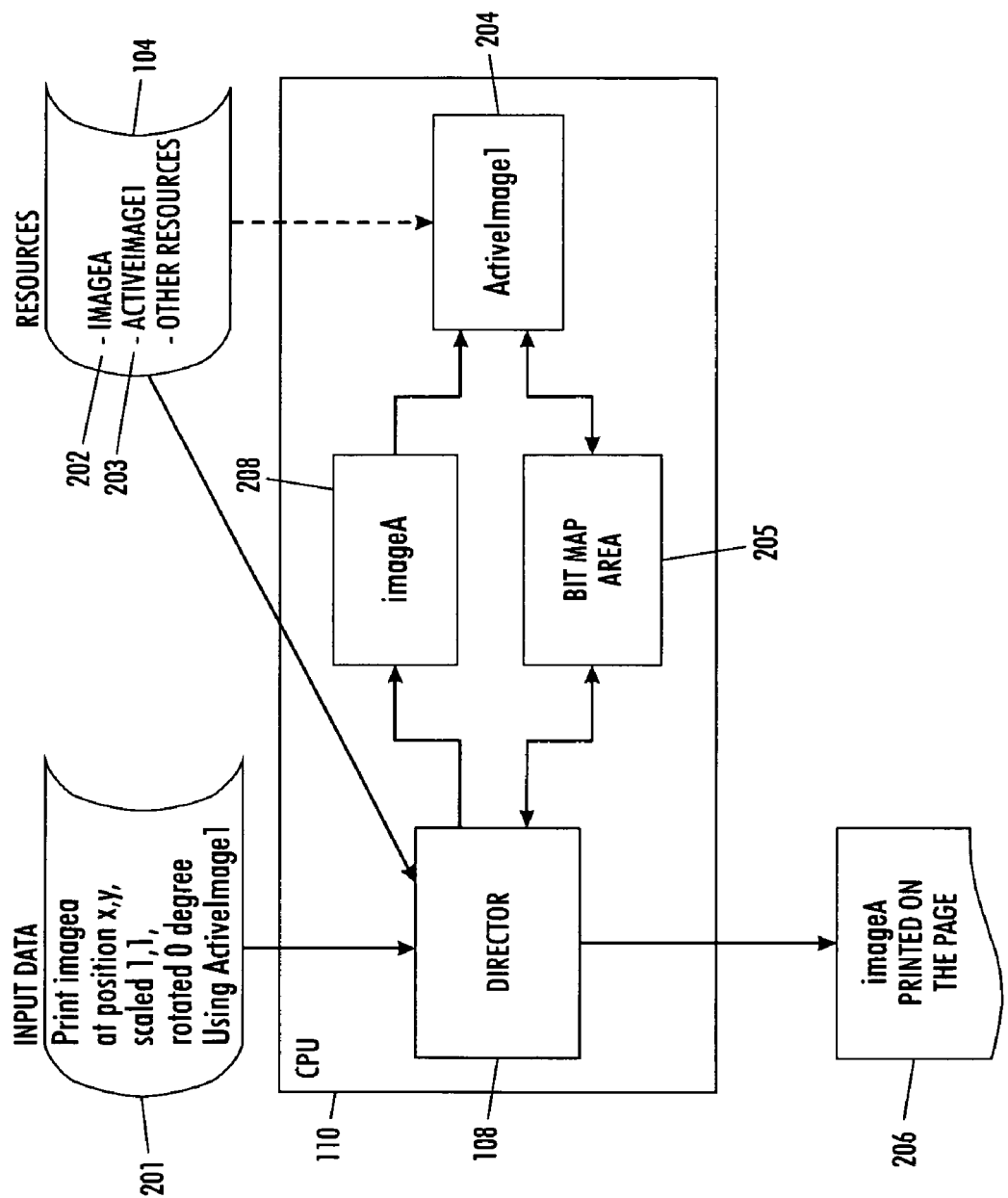
FIG. 2 is a schematic representation of an exemplary system embodiment.

FIG. 2 illustrates an example where the resource 104 necessary to print the page 206 is an image, imageA 202. ImageA 202 is encoded in a way unknown to the director, therefore the director 108 cannot convert the image 202 to a raw bit map (an uncompressed bit map). There is an active stamp (ActiveImage1) 203 that was developed to decode images of the imageA 202 type. So, the director 108 loads the active stamp ActiveImage1 203 into memory 204, reads imageA 202, stores imageA 202 in the local resource 208, and makes imageA 202 available (passes imageA 202 to the copy of active stamp ActiveImage1 203 in memory 204 together with the bit map 205 address). The copy of the active stamp ActiveImage1 203 in memory 204 performs the imageA 202 conversion into a raw bit map and fills the bit map area 205 with the result. Once the copy of the active stamp ActiveImage1 203 in the memory 204 is finished with the conversion process, the copy of the active stamp ActiveImage 203 returns the CPU 110 control to the director 108. The director 108 proceeds to print/display 206 the page using the bit map 208 set up by the ActiveImage1 203 active stamp.

In some embodiments, all active stamps communicate with the directors using the same communication protocol and all the directors that will use active stamps have the ability to use this communication protocol. The director receives instructions of the need to print imageA based on control information contained in the input data stream 201. Further, the input data stream includes a command regarding which active stamp should be used. Thus, the director 108 knows that ActiveImage1 203 is the proper active stamp because this information comes in the input data stream (from input 201) together with the reference to imageA 201. For example, the input data stream contains a command that requests the director 108 to print imageA 202, using ActiveImage1 203 to decode imageA 202.

When the director 108 receives the instruction that ActiveImage1 203 is to be used, the director 108 will take the necessary steps (e.g., search) to find ActiveImage1 203 in the resources 104 and load ActiveImage1 203 into the memory 204 so that ActiveImage1 203 will be available when needed. This process of finding, retrieving, and storing the active stamp is called the "instantiation" of the active stamp. At instantiation time, the director will transmit the address of the bit map area 205 to the active stamp. It should be noted that the address of the whole bit map area 205, not just the more limited address within the bit map area 205 where imageA should be rendered, is transmitted from the director 108 to the active stamp.

The director 108 will "invoke" the active stamp (ActiveImage1 203 stored within the memory 204) by sending a command to the active stamp requesting the active stamp to convert imageA and put the result into the bit map area 205 (e.g., at location x,y; scaled at a certain factor; and rotated a certain number of degrees, if necessary). The timing of when to perform the conversion is set to match the specific design of the device, including the hardware and software environment of the specific processor, as well as many other factors. In one example, the active stamp can be invoked immediately after the instantiation, so that the conversion is performed immediately. Alternatively, the active stamp can be invoked (and the data converted to a bit map) later when the director sends a command to the active stamp, invoking the active stamp, which then performs the conversion and renders the bit map.

Figure 3:
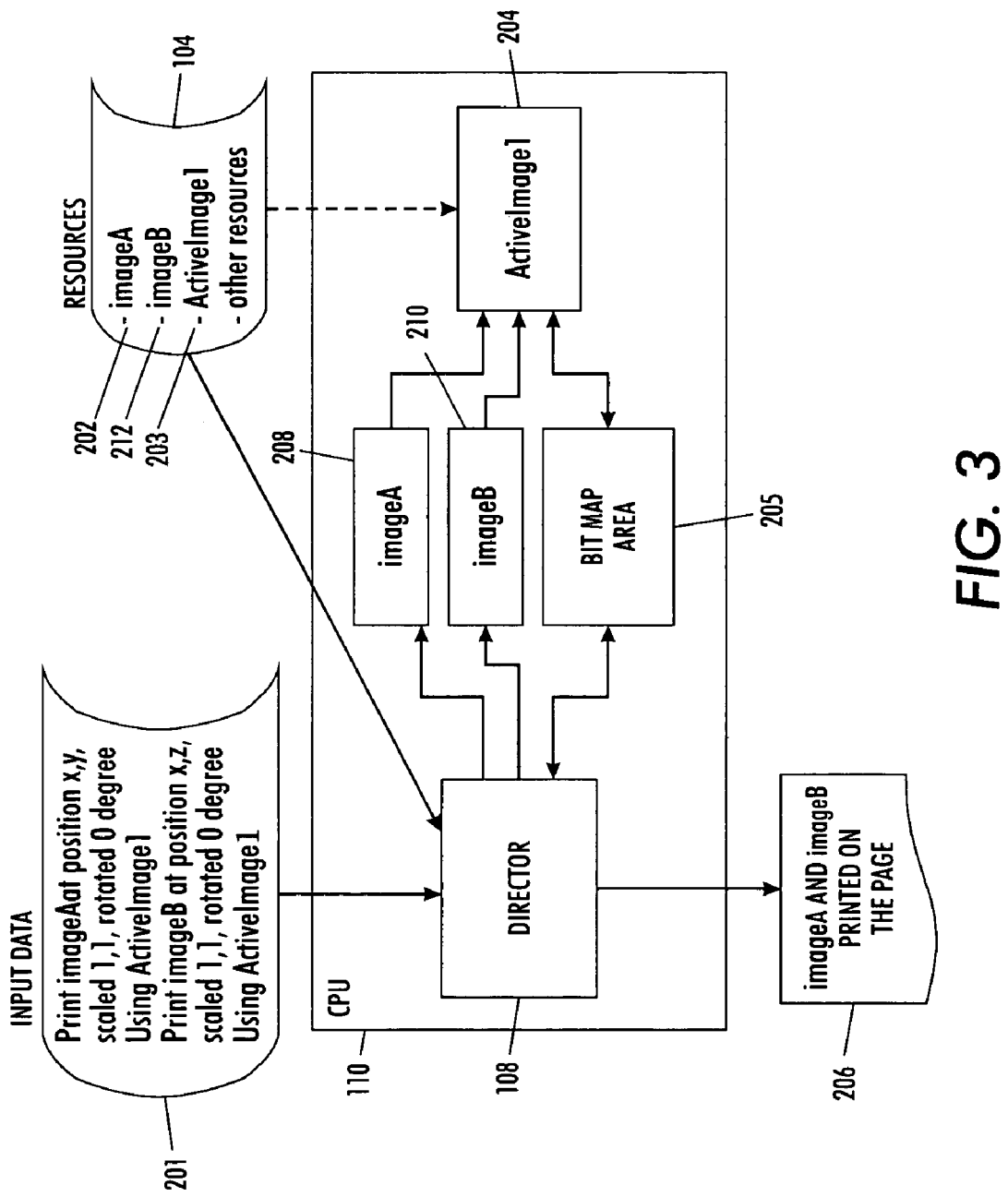
FIG. 3 is a schematic representation of an exemplary system embodiment.

Another example of embodiments herein that processes two images (imageA 203 and imageB 212, potentially of the same type) that are to be printed on a page or displayed on a screen, is shown in FIG. 3. In this example, if imageA 203 and imageB 212 are of the same type of compression, formatting, scaling, etc., or are capable of being similarly processed by a single one of the many active stamps that are discussed above, a single active stamp (e.g., ActiveImage1 203) can be used to decode both images and only one instantiation of ActiveImage1 203 would be necessary. This is shown in item 201 of FIG. 3, where the print commands for imageA 202 and imageB 212 use the same scaling (1.1), the same rotation (0 degrees), different locations (X,Y; X,Z), and the same active stamp ActiveImage1 203. Local resources 208 and 210 are used to store the unconverted imageA 202 and imageB 212 while they await conversion by the active stamp ActiveImage1 203 stored in the memory 204. The images could be processed sequentially by the single active stamp. Again, the active stamp ActiveImage1 203 can be invoked immediately after instantiation so that the images can be converted immediately (sequentially), or the invocation can occur later upon the sending of a command from the director 108 to the active stamp. It should be noted that the two invocations of ActiveImage1 for each of the different images can be, but do not need to be contiguous to (immediately following) each other.

Figure 4:
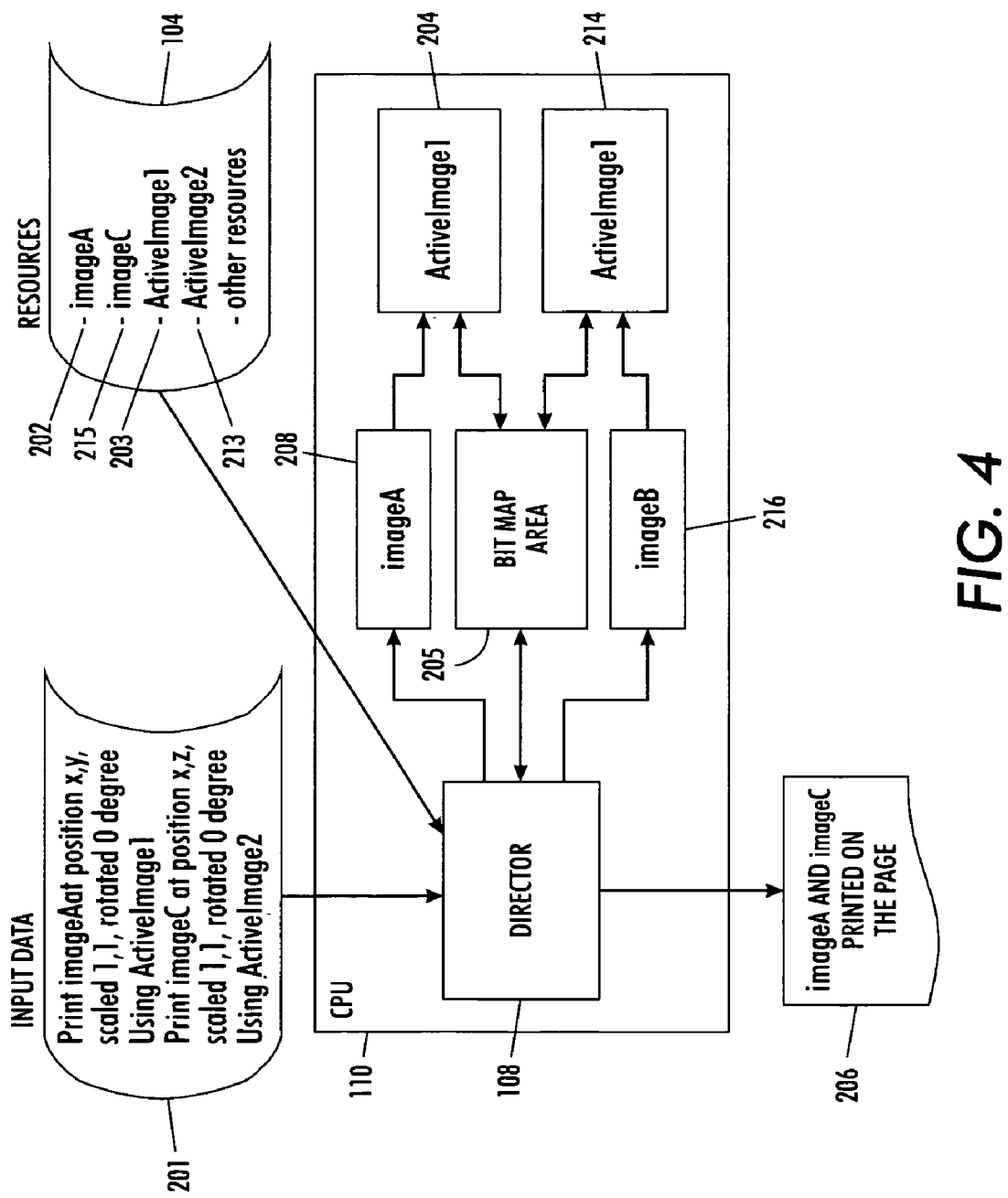
FIG. 4 is a schematic representation of an exemplary system embodiment.

FIG. 4 shows another embodiment that is similar to that shown in FIG. 3; however, in the example in FIG. 4, the two image files (imageA 202 and imageC 215) are to be processed by different active stamps (ActiveImage1 203 and ActiveImage2 213). Local resources 208 and 216 are used to store the unconverted imageA 202 and imageC 215 while they await conversion by the active stamps ActiveImage1 203 and ActiveImage 213, stored in the memories 204, 214. The images could be processed sequentially by each active stamp and/or simultaneously, where one active stamp processes one image while the other active stamp processes the other image. Again, the active stamps can be invoked immediately after instantiation so that the images can be converted immediately (sequentially or simultaneously), or the invocation can occur later upon the sending of a command from the director 108 to the active stamps. Also, as discussed above, the invocations of the active stamps can be, but do not need to be contiguous to (immediately following) each other. Further, while these examples discusse two images, one ordinarily skilled in the art would understand that many more than two images could be handled (sequentially or simultaneously) in the same manner by embodiments herein.

Figure 5:
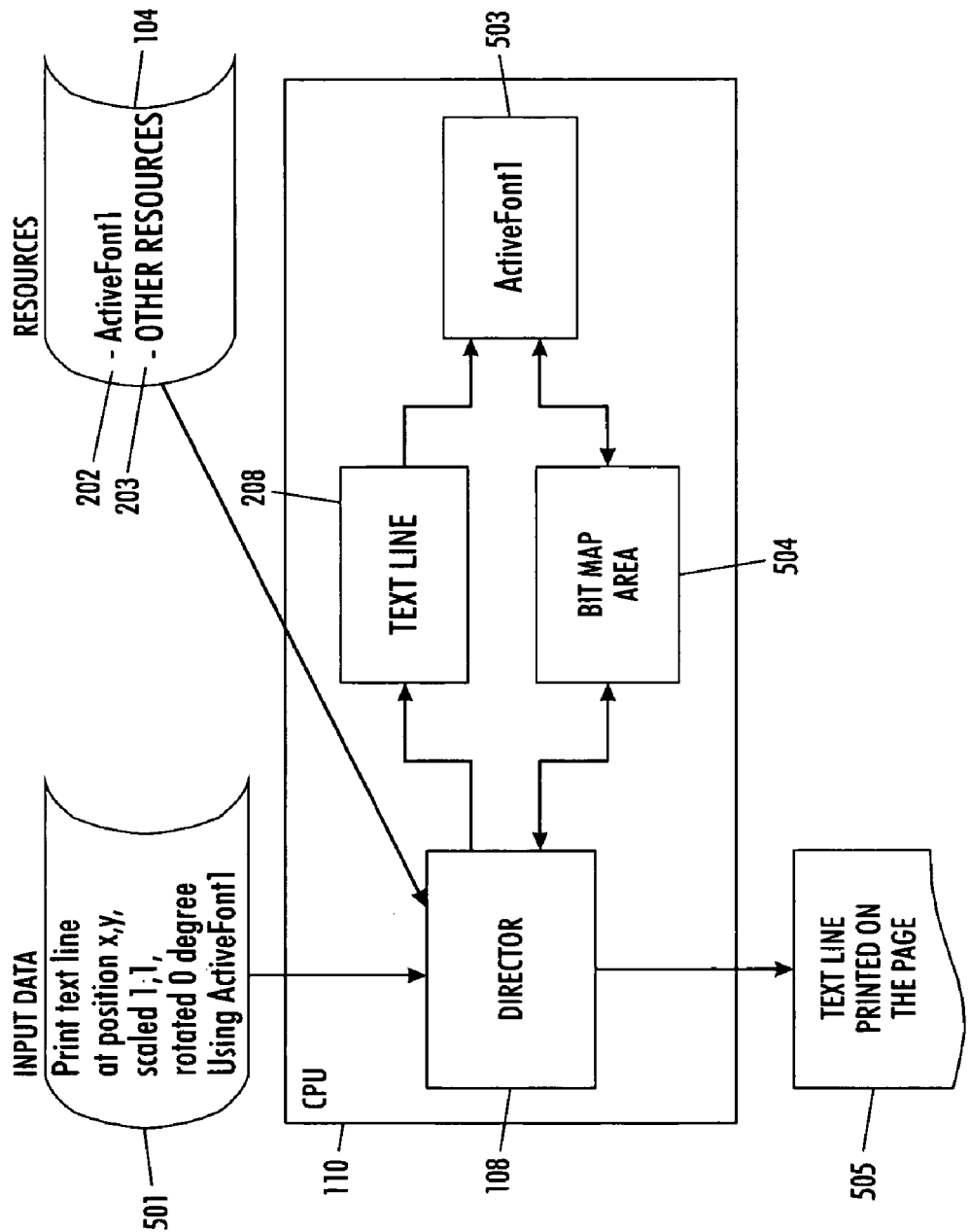
FIG. 5 is a schematic representation of an exemplary system embodiment.

Some exemplary ActiveStamps that are discussed above include ActiveFont, ActiveTypeSetter, ActiveLogotype, ActiveImage, ActiveDrawer, ActiveForm, ActiveSection, ActivePage, ActivePlate, etc. FIG. 5 depicts the use of an ActiveFont stamp and this example is intended to illustrate the operation of any such specialized active stamp, including but not limited to all those mentioned above. Again, one function of the ActiveFont active stamp is to produce a bit map of a text string, such as the text line in internal resource 208. In this case, the text string is read into the internal resource 208 by the director 108 from the input media 501. As discussed in the previous examples, the input data 501 contains instructions about which ActiveFont to use (e.g., ActiveFont1 502), where (X,Y) the text should be positioned in the bit map area 504, the orientation of the line (the direction the string of characters are to progress), the rotation of each character, the scaling of the text, etc. This information is used by the director 108 to command the ActiveFont1 502 (stored into memory 503 from the external resource 104) to render the bit map of the text line in the bit map area 504. Finally, the director uses the bit map to print the page 505.

As discussed above, the active stamps of embodiments herein are specialized. Therefore, a text string would not be submitted to an ActiveImage stamp. Similarly, an image would not be submitted to an ActiveFont stamp. The generator of the input data stream is responsible for commanding the use of the proper active stamp for each object that needs to be handled. The active stamps according to embodiments herein can perform certain levels of validation as to reduce the occurrence of unexpected results. Thus, the active stamp can perform a verify that the type of data within the internal resource 208 is compatible with its own purpose. If they are, processing continues. If they are not, processing can stop, and an error message can be generated.

Figure 6:
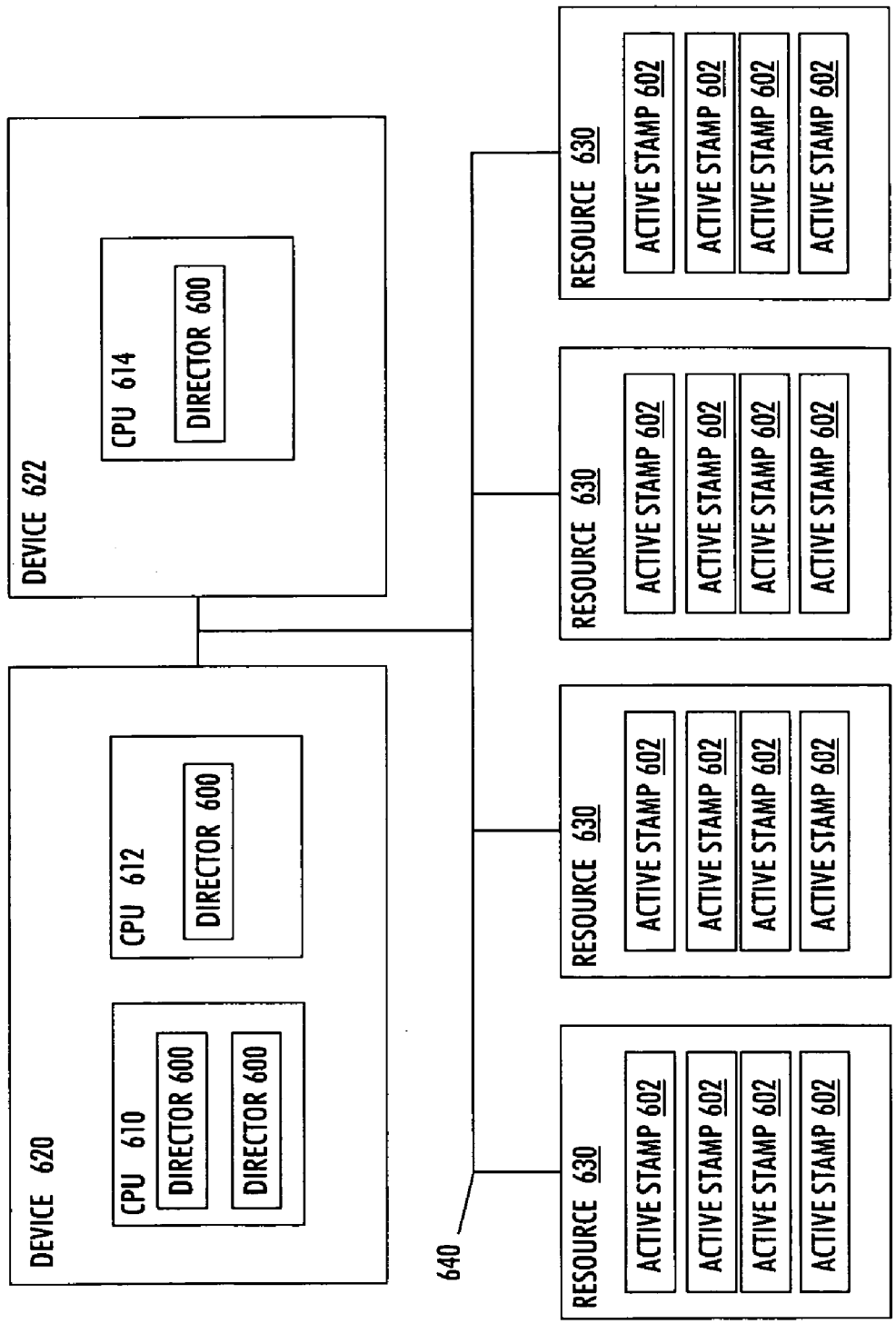
FIG. 6 is a schematic representation of an exemplary system embodiment.

FIG. 6 is an illustration of the relationship between many different directors 600 that can be operating on the same processor 610, on many different processors 610, 612 within a given device 620, or on different processors 610, 612, 614 within different devices 620, 622. As mentioned above, the different active stamps 602 stored in the different resources 630 are generically applicable to a plurality of different directors 600, such that each of the active stamps can be invoked by the different directors to perform the same operation for each of the different directors 600. Therefore, the resources 630 that maintain the active stamps 602 are operatively connected to the different directors 600 in a structure 640 that allows each of the different directors 600 to individually access each of the different active stamps 602, such as a local area network, wide area network, etc. The active stamps 602 that are selected by the directors correspond to a current data manipulation process being invoked by each of the different directors.

Figure 7:
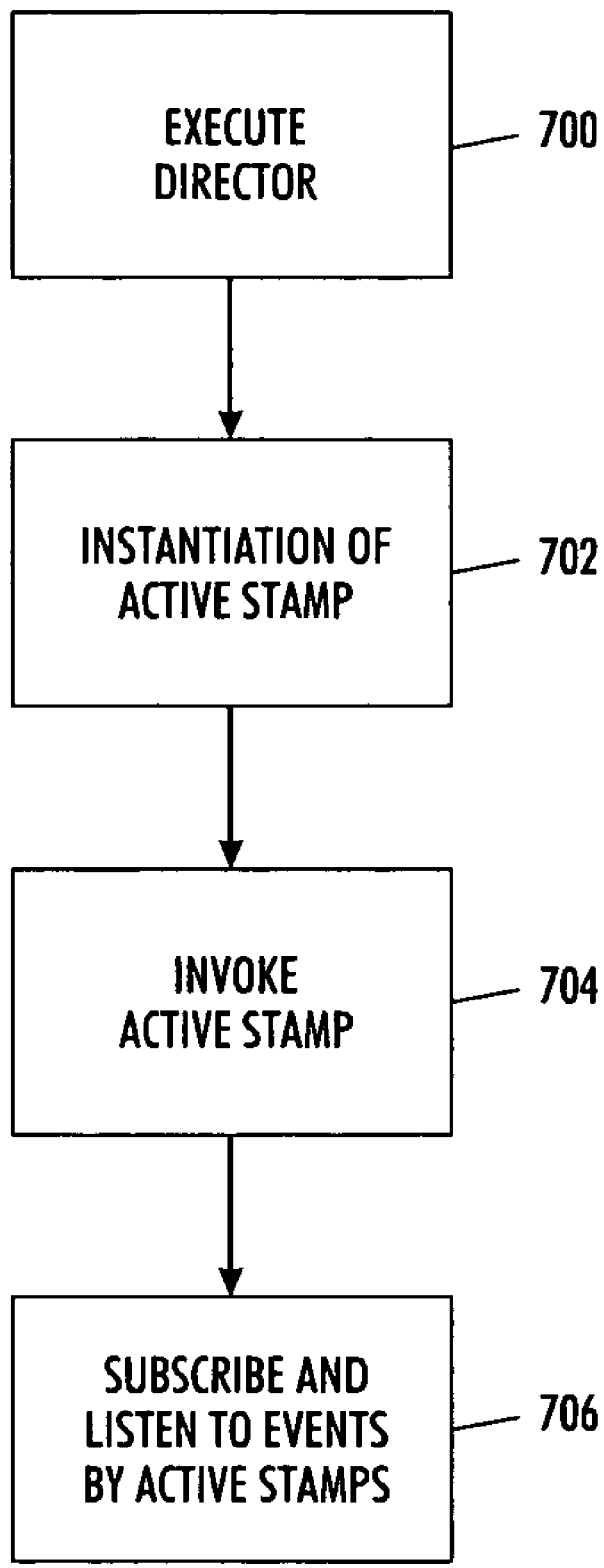
FIG. 7 is a flow diagram illustrating embodiments herein.

FIG. 7 illustrates the processing of one exemplary embodiment herein in flow chart form. More specifically, in item 700, the method executes the director. The instantiation of the active stamps by the director in item 702 calls the active stamps from an active stamp repository (resource) in a structure that allows each of the different directors to individually access each of the active stamps that correspond to a current data manipulation process being invoked by each of the different directors. In item 704, the director invokes at least one "active stamp" when processing data, where each of the active stamps relates to a different data manipulation method. Again, the active stamps are specialized, portable and dynamic logic processes generically applicable to a plurality of different directors. Therefore, in item 704 each of the active stamps can be individually invoked by each of the different directors to perform the same operation for each of the different directors. Different directors operate independently, thus each director can act in parallel (simultaneously) with other directors and can be simultaneously invoking the same active stamp on different data streams. Because the director invokes the active stamps in item 704 at run time of the processing of the data, the active stamps avoid having to be compiled with the director. The active stamps can also subscribe and listen to events as they occur during the processing of the data in item 706.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A system comprising:
    a director operatively connected to a plurality of active stamps; and
    a processor on which said director executes,
    wherein said director is adapted to invoke at least one of said active stamps when decompressing input data and commands to produce bit maps,
    wherein each of said active stamps relates to a different decompression method, based on particular input data and commands, and
    wherein said active stamps are called by said director at run time of said decompressing of said input data and commands, and said active stamps avoid having to be compiled with said director.

2. The system according to claim 1, wherein said active stamps are generically applicable to a plurality of different directors such that each of said active stamps can be invoked by said different directors to perform the same operation for each of said different directors.

3. The system according to claim 2, further comprising a resource operatively connected to said different directors in a structure that allows each of said different directors to individually access each of said active stamps that correspond to a current decompression process being invoked by each of said different directors.

4. The system according to claim 1, wherein said active stamps are adapted to subscribe and listen to events as they occur during said decompressing of said data.

5. A method comprising:
    executing a director on a processor, wherein said director is operatively connected to a plurality of active stamps; and
    invoking, by said director, at least one of said active stamps when decompressing input data and commands to produce bit maps,
    wherein each of said active stamps relates to a different input data decompression method, based on particular input data and commands, and
    wherein said invoking of said active stamps by said director calls said active stamps at run time of said decompressing of said input data, and said active stamps avoid having to be compiled with said director.

6. The method according to claim 5, wherein said active stamps are generically applicable to a plurality of different directors such that each of said active stamps can be invoked by said different directors to perform the same operation for each of said different directors.

7. The method according to claim 6, wherein said invoking of said active stamps by said director calls said active stamps from a resource operatively connected to said different directors in a structure that allows each of said different directors to individually access each of said active stamps that correspond to a current input data and commands decompression process being invoked by each of said different directors.

8. The method according to claim 5, further comprising subscribing and listening, by said active stamps, to events as they occur during said decompressing of said input data and commands.

9. A system comprising:
    a director operatively connected to a plurality of active stamps; and
    a processor on which said director executes,
    wherein said director is adapted to invoke at least one of said active stamps when decompressing input data and commands to produce bit maps,
    wherein each of said active stamps relates to a different decompression method, based on particular input data and commands, and said active stamps are generically applicable to a plurality of different directors such that each of said active stamps can be invoked by said different directors to perform the same operation for each of said different directors, and
    wherein said active stamps are called by said director at run time of said decompressing of said input data and commands, and said active stamps avoid having to be compiled with said director.

10. The system according to claim 9, further comprising a resource operatively connected to said different directors in a structure that allows each of said different directors to individually access each of said active stamps that correspond to a current decompression process being invoked by each of said different directors.

11. The system according to claim 9, wherein said active stamps are adapted to subscribe and listen to events as they occur during said decompressing of said input data and commands.

12. A method comprising:
    executing a director on a processor, wherein said director is operatively connected to a plurality of active stamps; and
    invoking, by said director, at least one of said active stamps when decompressing input data and commands to produce bit maps,
    wherein each of said active stamps relates to a different data decompression method, based on particular input data and commands, and said active stamps are generically applicable to a plurality of different directors such that each of said active stamps can be invoked by said different directors to perform the same operation for each of said different directors, and wherein said invoking of said active stamps by said director calls said active stamps at run time of said decompressing of said input data and commands, and said active stamps avoid having to be compiled with said director.

13. The method according to claim 12, wherein said invoking of said active stamps by said director calls said active stamps from a resource operatively connected to said different directors in a structure that allows each of said different directors to individually access each of said active stamps that correspond to a current input data and commands decompression process being invoked by each of said different directors.

14. The method according to claim 12, further comprising subscribing and listening, by said active stamps, to events as they occur during said decompressing of said input data and commands.

15. The system according to claim 1, wherein said director instantiates said active stamps from a resource only once.

16. The method according to claim 5, wherein said director instantiates said active stamps from a resource only once.

17. The system according to claim 9, wherein said director instantiates said active stamps from a resource only once.

18. The method according to claim 12, wherein said director instantiates said active stamps from a resource only once.

* * * * *